United States Patent
Fulks et al.

(12) 
(10) Patent No.: US 6,301,883 B1
(45) Date of Patent: Oct. 16, 2001

(54) VEHICLE BRAKE BOOSTER WITH SUPPLEMENTAL VACUUM ASSIST

(75) Inventors: Gary Chris Fulks, Dayton; James William Zehnder, II, Huber Heights; Douglas E. Poole, Dayton; Timothy Allen Haerr, Enon; Michelle Kay Goecke; Timothy M. Schlangen, both of Dayton, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/374,664

(22) Filed: Aug. 16, 1999

(51) Int. Cl.$^7$ ........................................ F16D 31/02
(52) U.S. Cl. .............................. 60/397; 60/411; 60/412
(58) Field of Search ............................. 60/397, 486, 407, 60/409, 410, 411, 412

(56) References Cited

U.S. PATENT DOCUMENTS

| | | | |
|---|---|---|---|
| 2,705,870 | * | 4/1955 | Holton ................................. 60/397 |
| 2,844,003 | * | 7/1958 | Ingres ................................. 60/397 |
| 4,024,709 | | 5/1977 | Erdmann ............................. 60/397 |
| 4,412,416 | * | 11/1983 | Van House ......................... 60/397 |
| 4,738,112 | * | 4/1988 | Nomura et al. ................ 60/397 X |
| 5,961,189 | * | 10/1999 | Lutteke et al. ................ 60/412 X |

FOREIGN PATENT DOCUMENTS 57-164854
(A) * 10/1982 (JP) ....................................... 60/397

* cited by examiner

Primary Examiner—John E. Ryznic
(74) Attorney, Agent, or Firm—Robert M. Sigler

(57) ABSTRACT

A brake booster provides additional boost capacity without unduly increasing booster size and weight by providing a vacuum pump connected so as to add its additional vacuum capacity to that of the normal vacuum source when activated in response to sensed approaching run-out. The additional vacuum is provided by connecting the vacuum pump in a second conduit between the vacuum source and the booster vacuum chamber in parallel with a first conduit connecting the vacuum source directly with the booster vacuum chamber, with check valve means in the first and second conduits preventing substantial vacuum loss from the vacuum chamber. Approaching run-out is signaled by a sensor responsive to a vacuum level in the working chamber; and control means are responsive to a predetermined low value of the sensed vacuum level in the working chamber to activate the vacuum pump and thus increase the vacuum level in the vacuum chamber over that produced by the vacuum source, whereby a greater pressure differential is available across the booster diaphragm before run-out is encountered. An optional sensor responsive to vacuum level in the vacuum chamber enables the vacuum pump to be additionally used for backup of the vacuum source while still providing the functionality of the invention in most cases. The venting of the vacuum pump to the vacuum source reduces released noise which might otherwise require bulky noise filter apparatus.

6 Claims, 1 Drawing Sheet

VEHICLE BRAKE BOOSTER WITH SUPPLEMENTAL VACUUM ASSIST

TECHNICAL FIELD

The technical field of this invention is vehicle brake boosters of the type providing a differential pressure actuator working with a source of vacuum.

BACKGROUND OF THE INVENTION

Power brake assist using differential pressure actuated brake boosters is standard in the motor vehicle industry. These brake boosters have a diaphragm separating a vacuum chamber always open to a source of vacuum, such as created in an engine intake passage, and a working chamber normally provided with vacuum but controlled by valve apparatus responsive to input brake pedal actuation to allow atmospheric air therein and thus provide brake force assist through the diaphragm. In some systems, it is also known to provide a vacuum pump, either in place of the engine vacuum source or as a backup therefor, to provide a normal supplied vacuum.

But such brake boosters, which increase brake assist by decreasing vacuum in the working chamber, reach a limiting assist condition, called run-out, when the working chamber reaches atmospheric pressure. Although such boosters are generally designed so as to rarely reach the run-out condition, engine vacuum is limited and large, heavily loaded vehicles especially may require larger brake assist levels. Potential assist levels may be increased somewhat by the use of multiple diaphragm and chamber designs as are known in the art; but great size and weight penalties may result for assist capacity that is rarely used. It is desirable to provide a brake booster assist supplementing apparatus that provides such occasional greater than normal assist levels without incurring the size and weight penalties of a very large booster.

SUMMARY OF THE INVENTION

The brake booster of this invention provides additional boost capacity without unduly increasing booster size and weight by providing a vacuum pump connected so as to add its additional vacuum capacity to that of the normal vacuum source when activated in response to sensed approaching run-out. The additional vacuum is provided by connecting the vacuum pump in a second conduit between the vacuum source and the booster vacuum chamber in parallel with a first conduit connecting the vacuum source directly with the booster vacuum chamber, with check valve means in the first and second conduits preventing substantial vacuum loss from the vacuum chamber. Approaching run-out is signaled by a sensor responsive to a vacuum level in the working chamber; and control means are responsive to a predetermined low value of the sensed vacuum level in the working chamber to activate the vacuum pump and thus increase the vacuum level in the vacuum chamber over that produced by the vacuum source, whereby a greater pressure differential is available across the booster diaphragm before run-out is encountered. An optional sensor responsive to vacuum level in the vacuum chamber enables the vacuum pump to be additionally used for backup of the vacuum source while still providing the functionality of the invention in most cases. The venting of the vacuum pump to the vacuum source reduces released noise which might otherwise require bulky noise filter apparatus.

DESCRIPTION OF THE PREFERRED EMBODIMENT

Figure 1:
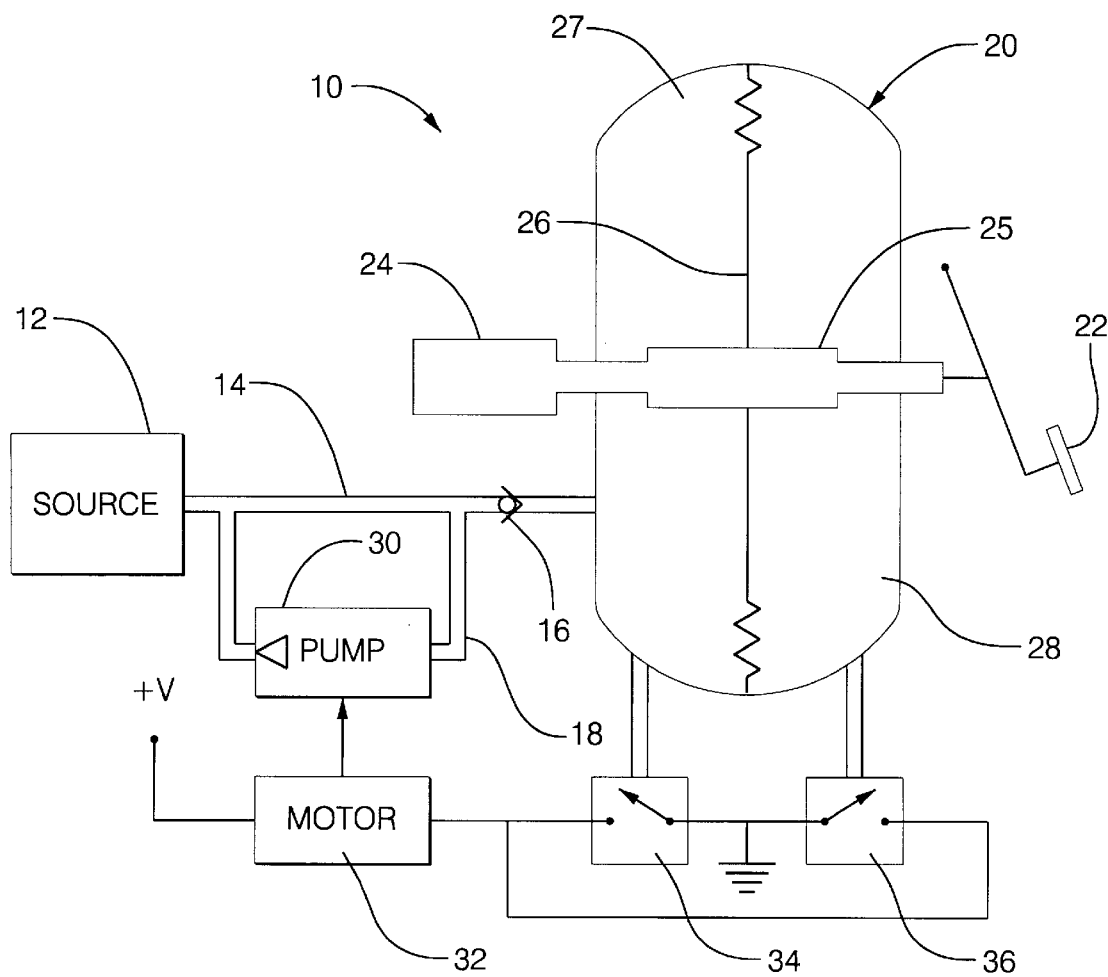
FIG. 1 shows a schematic diagram of a preferred embodiment of the apparatus of the invention.

Referring to FIG. 1, a motor vehicle, generally indicated as 10, includes a primary source of vacuum 12, which is typically an air induction passage of a vehicle engine but could alternatively be a motor driven vacuum pump. A vehicle power brake system includes a brake booster 20 that receives an input brake activation from a brake pedal 22 and communicates the activation to a master cylinder 24 through a valve and power piston apparatus 25 of known construction in the normal manner. A portion of the body of booster 20 is divided by a diaphragm 26 into a vacuum chamber 27 and a working chamber 28 to create a differential pressure actuator. Vacuum chamber 27 is connected to vacuum source 12 through a conduit 14 with a check valve 16 which permits air flow only out of vacuum chamber 27 toward source 12 and thus substantially prevents loss of vacuum from vacuum chamber 27. Thus, vacuum source 12 normally maintains a substantially constant vacuum level, relative to atmospheric pressure, in vacuum chamber 27. Working chamber 28 is controlled by a multiple valve apparatus, not shown, to normally maintain a vacuum when brake pedal 22 is not activated but to admit atmospheric air in response to activation of brake pedal 22 so as to provide pressure on diaphragm 26 to the left in the FIG. This pressure is communicated by diaphragm 26, through apparatus not shown, as an output brake assist force to master cylinder 24. The parts of brake booster 20 not shown, are standard in construction and operation, the details of which are well known in the art and essentially irrelevant to this invention. Examples may be found in U.S. Pat. No. 3,249,021 to Wuellner and U.S. Pat. No. 4,069,742 to Gephart et al, as well as many others.

A vacuum pump 30 is provided in a conduit 18 connected in parallel with conduit 14 and sharing check valve 16. Vacuum pump 30 is driven by an electric motor 32, the latter being optionally connected electrically in series with a DC electric power source +V and a vacuum switch 34. Vacuum switch 34 comprises a pressure sensor sensitive to the vacuum level in vacuum chamber 27 relative to atmospheric pressure and a switch responsive to the sensed vacuum level that closes below a predetermined vacuum level such as, for example, 10 inches Hg, and opens at higher levels. Thus, vacuum pump 30 may optionally be used as a backup vacuum source providing a minimum predetermined vacuum level if the output of vacuum source 12 falls too low. Such vacuum level backup, although known, is a side benefit of the apparatus of this invention and may be particularly useful when vacuum source 12 is an engine induction passage, the vacuum level in which can vary greatly in use.

Electric motor 32 is also connected in series with DC power source +V and a vacuum switch 36, which comprises a pressure sensor sensitive to the vacuum level in working chamber 28 relative to atmospheric pressure and a switch responsive to the sensed vacuum level that closes below a predetermined vacuum level such as, for example, 2.5 inches Hg, and opens at higher levels. Vacuum switch 36 controls vacuum pump 30 via electric motor 32 to provide supplemental boost assist as booster 20 approaches run-out in the following manner. As a vehicle operator applies increasing force to brake pedal 22 in such a way as to demand increasing boost assist, booster 20 will provide decreasing vacuum in working chamber 28 in the normal manner. But before booster 20 reaches run-out, when the decreasing vacuum reaches the predetermined level (2.5 inches Hg), vacuum switch 36 closes to activate motor 32 and thus vacuum pump 30. Since vacuum pump 30 exhausts air from vacuum chamber 27 to vacuum source 12 at the output vacuum level of the latter, it will provide a boot-strap effect to increase the vacuum level in vacuum chamber 27 relative to the output level of vacuum source 12, as long as vacuum source 12 is providing vacuum. The greater supplied vacuum that results in vacuum chamber 27 will thus produce a greater potential pressure differential across diaphragm 26, even at run-out, to provide a greater boost assist force than would be possible without the operation of vacuum pump 30.

As an example, of the benefit of this invention, assume a normal vacuum source 12 output of 20 inches Hg and a maximum 20 inch Hg output of vacuum pump 30. This combination produces a potential pressure differential across diaphragm 26 of 40 inches Hg: twice the normal output at run-out. If vacuum source 12 is engine vacuum and decreases to 11 inches Hg, the potential pressure differential across diaphragm 26 is 31 inches Hg, still more than 50 percent greater than that with vacuum source 12 alone. If the output of vacuum source 12 is only 5 inches Hg and optional vacuum switch 34 is present to activate vacuum pump 30 as required for the maintenance of 10 inches Hg, vacuum switch 36 is capable of overriding vacuum switch 34 as required to provide a pressure differential across diaphragm 26 of as much as 25 inches Hg at run-out, which is still greater than that providable by vacuum source 12 alone. Finally, if vacuum source 12 provides no vacuum at all, vacuum switch 36 is capable of overriding vacuum switch 34 to provide the full 20 inches Hg of vacuum from vacuum pump 30 when required.

It should be noted that the extra vacuum provided by vacuum pump 30 in response to the vacuum level in working chamber 28 as sensed by vacuum switch 36 is delivered only when the booster nears run-out; and vacuum pump 30 is not otherwise operating, unless activated by optional vacuum switch 34 due to insufficient normal supplied vacuum from vacuum source 12. Thus, the invention uses no more energy in pump operation than is required for the occasional braking events requiring supplemented braking boost force. Electric motor operated vacuum pumps achieving reasonable levels such as 20 inches Hg are available in sizes and weights that are attractive compared to the increase in size and weight required to achieve the equivalent output in the booster itself. Also, the venting of vacuum pump 30 to vacuum source 12, particularly where the latter is an engine induction passage, minimizes the extra noise that would result from venting such a pump directly to atmosphere and thus eliminates the need for a large noise filter.

Figure 2:
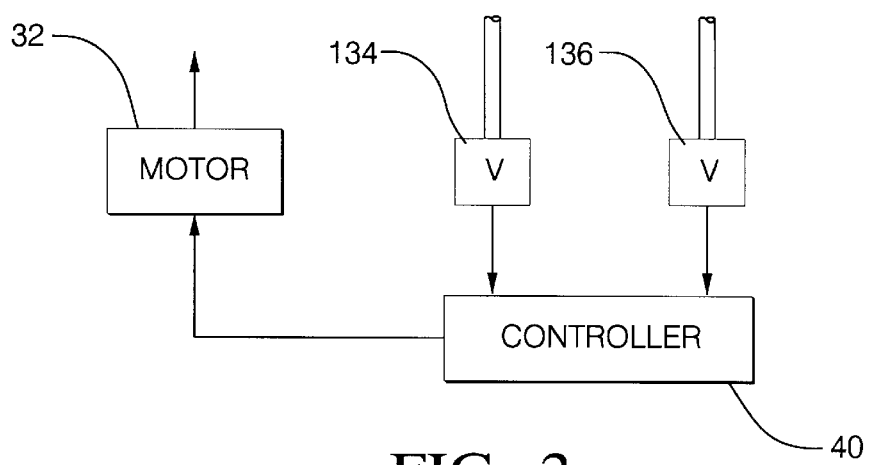
FIG. 2 shows a schematic diagram of an alternative embodiment of the apparatus of the invention.

FIG. 2 shows an alternative embodiment of the invention wherein the vacuum switches 34 and 36 are replaced by pressure sensors 134 and 136, which provide output signals to an electronic controller 40 that controls the operation of motor 32 and thus vacuum pump 30. Controller 40 may suitably designed as a circuit or programmed as a computer by one of ordinary skill in the art to compare the pressure signals from sensors 134 and 136, indicative of the vacuum levels within vacuum chamber 27 and working chamber 28 respectively, with stored values representing the predetermined vacuum levels and, responsive to these comparisons, to activate motor 32 as described above, through standard motor drive circuitry, to accomplish the same operation.

What is claimed is:

1. A brake booster for a vehicle having a source of vacuum, the booster having a body with a diaphragm defining a vacuum chamber and a working chamber therein and further comprising, in combination:

a first conduit connecting the source of vacuum to the vacuum chamber;

a vacuum pump having an activating motor;

a second conduit connecting the vacuum pump in parallel with the first conduit with pump air discharge toward the source of vacuum;

check valve means in the first and second conduits preventing substantial vacuum loss from the vacuum chamber through the first and second conduits, whereby a first vacuum level is normally maintained in the vacuum chamber by the source of vacuum;

a sensor responsive to a vacuum level in the working chamber; and control means responsive to a predetermined low value of the sensed vacuum level in the working chamber to activate the vacuum pump, whereby a second vacuum level, higher than the first vacuum level, is maintained in the vacuum chamber by the vacuum pump supplementing the source of vacuum.

2. The brake booster of claim 1 wherein the source of vacuum is a vehicle engine air induction passage.

3. The brake booster of claim 1 further comprising:

a sensor responsive to a vacuum level in the vacuum chamber; and control means responsive to a predetermined value of the sensed vacuum level in the vacuum chamber to activate the vacuum pump, whereby a third vacuum level, higher than the first vacuum level but lower than the second vacuum level, is provided by the vacuum pump supplementing the source of vacuum to maintain at least the third vacuum level in the vacuum chamber.

4. The brake booster of claim 3 wherein the source of vacuum is a vehicle engine air induction passage.

5. The brake booster of claim 1 wherein the vacuum pump is activated by an electrical motor and the sensor and control means are combined in a vacuum switch electrically connected with a source of electric power to control the activation of the electric motor and thus the vacuum pump.

6. The brake booster of claim 1 wherein the predetermined low value of the sensed vacuum level in the working chamber is 2.5 inches Hg.

* * * * *